United States Patent
Jefferies et al.

(10) Patent No.: US 9,707,850 B2
(45) Date of Patent: Jul. 18, 2017

(54) EVSE HANDLE WITH AUTOMATIC THERMAL SHUT DOWN BY NTC TO GROUND

(71) Applicant: SCHNEIDER ELECTRIC USA, INC., Palatine, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Raleigh, NC (US); Richard K. Weiler, Raleigh, NC (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 100 days.

(21) Appl. No.: 14/546,334

(22) Filed: Nov. 18, 2014

(65) Prior Publication Data

US 2016/0137079 A1 May 19, 2016

(51) Int. Cl.
*H02J 7/00* (2006.01)
*B60L 11/18* (2006.01)
(Continued)

(52) U.S. Cl.
CPC .............. *B60L 11/1816* (2013.01); *B60L 3/00* (2013.01); *B60L 3/04* (2013.01); *B60L 11/1809* (2013.01);
(Continued)

(58) Field of Classification Search
CPC .............. B60L 11/1809; B60L 11/1816; B60L 11/1818; B60L 11/1824; B60L 3/00; B60L 3/04; H02H 3/021; H02H 5/04
(Continued)

(56) References Cited

U.S. PATENT DOCUMENTS 2,991,397 A 6/1961 Place
3,947,759 A 3/1976 Briggs
(Continued)

FOREIGN PATENT DOCUMENTS

CN 103107512 5/2013
DE 10 2009 034886 2/2011
(Continued)

OTHER PUBLICATIONS

ChargePoint Charging Station—Press Release Jul. 18, 2013.
(Continued)

*Primary Examiner* — Edward Tso
*Assistant Examiner* — Aaron Piggush
(74) *Attorney, Agent, or Firm* — Locke Lord LLP

(57) ABSTRACT

A temperature sensor 120 automatically shuts down charging operations in response to a temperature increase in a charging handle 150 of an electric vehicle charging station 100. The temperature sensor is connected between a ground conductor and a high voltage conductor L1 in the charging handle. The charging handle includes a return conductor L2/N. The temperature sensor includes a thermistor R1-NTC that changes its resistance in response to an increase in temperature in the charging handle. A portion of current in the high voltage conductor is diverted to the ground conductor, instead of the return conductor, in response to the thermistor sensing a temperature increase, thereby causing a ground fault detector 160 to trip in the charging station.

5 Claims, 5 Drawing Sheets

(51) Int. Cl.
*B60L 3/00* (2006.01)
*B60L 3/04* (2006.01)
*H02H 5/04* (2006.01)
*H02H 3/02* (2006.01)

(52) U.S. Cl.
CPC ....... *B60L 11/1818* (2013.01); *B60L 11/1824* (2013.01); *H02H 3/023* (2013.01); *H02H 5/04* (2013.01); *B60L 2230/12* (2013.01); *B60L 2240/36* (2013.01); *Y02T 10/7005* (2013.01); *Y02T 10/7088* (2013.01); *Y02T 90/121* (2013.01); *Y02T 90/14* (2013.01)

(58) Field of Classification Search
USPC .......................... 320/104, 109, 150; 307/10.1
See application file for complete search history.

(56) References Cited

U.S. PATENT DOCUMENTS

| | | |
|---|---|---|
| 5,351,005 A | 9/1994 | Rouse et al. |
| 5,504,414 A | 4/1996 | Kinoshita |
| 5,548,200 A | 8/1996 | Nor et al. |
| 6,510,793 B1 | 1/2003 | Kerr et al. |
| 8,013,570 B2 | 9/2011 | Baxter |
| 8,106,627 B1 | 1/2012 | Rossi |
| 8,294,415 B2 | 10/2012 | Fujitake |
| 8,368,349 B2 | 2/2013 | Zyren |
| 8,498,087 B2 | 7/2013 | Rabu et al. |
| 8,558,504 B2 | 10/2013 | Brown et al. |
| 8,643,330 B2 | 2/2014 | Nergaard et al. |
| 8,698,346 B2 | 4/2014 | Kamaga |
| 9,093,724 B2 | 7/2015 | Fujitake |
| 9,148,027 B2 | 9/2015 | Shane et al. |
| 9,156,362 B2 | 10/2015 | Soden et al. |
| 9,233,611 B2 | 1/2016 | Klesyk |
| 9,365,123 B2 | 6/2016 | Flack |
| 2008/0103552 A1 | 5/2008 | Goetz et al. |
| 2009/0167537 A1 | 7/2009 | Feliss et al. |
| 2009/0316321 A1 | 12/2009 | Ouwerkerk |
| 2010/0225271 A1 | 9/2010 | Oyobe et al. |
| 2011/0010043 A1 | 1/2011 | Lafky |
| 2011/0144823 A1 | 6/2011 | Muller et al. |
| 2011/0169447 A1 | 7/2011 | Brown et al. |
| 2011/0172839 A1* | 7/2011 | Brown ................. B60L 3/0069 700/292 |
| 2012/0032636 A1 | 2/2012 | Bianco |
| 2012/0098490 A1 | 4/2012 | Masuda |
| 2012/0119702 A1 | 5/2012 | Gaul et al. |
| 2012/0229089 A1 | 9/2012 | Bemmel et al. |
| 2012/0245880 A1 | 9/2012 | Nabrotzky |
| 2012/0249066 A1 | 10/2012 | Ichikawa |
| 2012/0249070 A1 | 10/2012 | Sellnar et al. |
| 2012/0277927 A1 | 11/2012 | Watkins et al. |
| 2012/0287542 A1 | 11/2012 | Bianco |
| 2013/0069441 A1 | 3/2013 | Verghese et al. |
| 2013/0217409 A1 | 8/2013 | Bridges et al. |
| 2013/0322017 A1 | 12/2013 | Muller et al. |
| 2014/0015487 A1 | 1/2014 | Brown et al. |
| 2014/0035527 A1* | 2/2014 | Hayashigawa ..... B60L 11/1818 320/109 |
| 2014/0049218 A1 | 2/2014 | Morand et al. |
| 2014/0091759 A1* | 4/2014 | Kagawa .................... B60L 3/04 320/109 |
| 2014/0179164 A1 | 6/2014 | Kanamori et al. |
| 2014/0203777 A1 | 7/2014 | Black |
| 2014/0232182 A1 | 8/2014 | Kinomura et al. |
| 2015/0291043 A1 | 10/2015 | Nam et al. |
| 2015/0303737 A1 | 10/2015 | Steinbuchel et al. |
| 2016/0009191 A1 | 1/2016 | Becker |
| 2016/0031335 A1 | 2/2016 | Soden et al. |
| 2016/0075244 A1 | 3/2016 | Im |
| 2016/0082852 A1 | 3/2016 | Kim |
| 2016/0257218 A1 | 9/2016 | Flack |
| 2017/0066340 A1 | 3/2017 | Flack |

FOREIGN PATENT DOCUMENTS

| | | |
|---|---|---|
| EP | 2190102 | 5/2010 |
| EP | 2332771 | 6/2011 |
| EP | 2432094 | 3/2012 |
| EP | 2581256 | 4/2013 |
| EP | 2800222 | 11/2014 |
| JP | 2013027144 | 2/2013 |
| WO | WO 2012129104 | 9/2012 |
| WO | WO2013124841 | 8/2013 |
| WO | WO2014036013 | 3/2014 |
| WO | WO 2014155947 | 10/2014 |

OTHER PUBLICATIONS

Vitor Monteiro, et al, "Comparison of Charging Systems for Electronic Vehicles and Their Impact on Electrical Grid", Annual Seminar on Automation, Industrial Electronics and Instrumentation 2012—SAEEI'12, pp. 440-445, Guimaraes, Portugal, Jul. 2012, ISBN: 978-972-98603-5-5.
(R) SAE Electric Vehicle Conductive Charge Coupler, SAE J1772, Revised Aug. 2001, Prepared by the SAE EV Charging Systems Committee.
Nick Sayer: "Google Code Archive—Long-term storage for Google Code Project Hosting.", Mar. 2, 2014 (Mar. 2, 2014), XP055260798, Retrieved from the Internet: URL:http://code.google.com/archive/p/open-evse/wikis/Hydra.wiki.
Bitblt; "SF BayLEAFs meeting: Feb. 2014", Youtube, Feb. 18, 2014 (Feb. 18, 2014), pp. 1-1, XP054976443, Retrieved from the Internet: URL:https://www.youtube.comiwatch?v=RW9G Em2iqr4.
Extended European Search Report for Application No. 15193312.4-1807 dated May 2, 2016.
SAE J1772™ Jan. 2010, "SAE Electric Vehicle and Plug in Hybrid Electric Vehicle Conductive Charge Coupler", published 2010.

* cited by examiner

EVSE HANDLE WITH AUTOMATIC THERMAL SHUT DOWN BY NTC TO GROUND

BACKGROUND OF THE INVENTION

1. Field of the Invention

The invention disclosed relates to electric vehicle supply equipment.

2. Discussion of the Related Art

Plug-in electric vehicles (EVs), including all-electric cars, neighborhood electric vehicles and plug-in hybrids, are becoming a popular mode for personal transportation, in part because they are less expensive to operate and have a reduced carbon footprint. Electric vehicle charging stations, also called Electric Vehicle Supply Equipment (EVSE), provide power to an EV through a standardized interface. The interface is defined by industry standard SAE J1772. The interface includes defined control signals, ground, and a high ampere current path. In the Level 2 alternating current (AC) charging standard, the EVSE may provide up to 80 A charging current to the connected EV.

The high ampere current path includes multiple junctions between conductors. The connection point between the cordset handle or charging handle of the EVSE and the receptacle of the EV is an example of a pin and socket junction. The construction of the EVSE charging handle commonly includes junctions that connect the wires of the cordset cable and the pins of the handle.

These multiple junctions represent opportunities for resistive heating along the current path between the EVSE and EV. For example, with manufacturing tolerances, mechanical ageing and reduction of contact pressure, chemical corrosion or oxidation of mating surfaces, or misuse and abuse leading to degraded performance, the current path within the EVSE charging handle can become increasingly resistive. Increased resistance may lead to overheating and possibly melting the charging handle while the handle is fastened to the EV during charging operations.

The present version of J1772 does not require any monitoring of the temperature in the current path, or any protection based on temperature increase along the current path. However, with the possibility of degraded performance at the junctions in the EVSE cordset caused by heating, it would be advantageous to provide temperature based protection, such as automatically shutting down charging operations in response to a temperature increase in the charging handle.

Present solutions for temperature based protections within the EVSE charging handle require additional, dedicated connection components between a temperature measurement device and the EVSE electronics. These include using additional conductors within the EVSE cord beyond those specified by the J1772 standard, or alternately using a wireless data transmission from the measurement device in the handle to the electronics of the EVSE.

SUMMARY OF THE INVENTION

The subject invention reduces the chances of overheating and possibly melting the charging handle while the handle is fastened to the EV during charging operations. The subject invention achieves the benefit of temperature based protection of the charging handle of an electric vehicle charging station or EVSE, without significant added cost or complexity. The invention utilizes existing components in the EVSE to achieve temperature based protection, with little or no modification required to the EVSE control electronics, and minimal modification required to the charging handle.

The invention provides a temperature sensor in a charging handle of an EVSE. The temperature sensor automatically shuts down charging operations in response to a temperature increase in a charging handle of the EVSE. The temperature sensor is connected between a ground conductor and a high voltage conductor in the charging handle. The charging handle includes a return conductor. The temperature sensor includes a thermistor that changes its resistance in response to an increase in temperature in the charging handle. A portion of current in the high voltage conductor is diverted to the ground conductor, instead of the return conductor, in response to the thermistor sensing a temperature increase, thereby causing a standard ground fault detector to trip in the EVSE.

In one example embodiment, the temperature sensor includes a pair of series connected thermistor and resistor circuits. A first series connected thermistor and resistor circuit connects the high voltage conductor to the ground conductor. A second series connected thermistor and resistor circuit connects the return conductor to the ground conductor. The ground fault detector in the EVSE is tripped if either thermistor senses an increased temperature and diverts current to the ground conductor.

In another example embodiment, the temperature sensor includes a thermistor and a first resistor connected in series between a control pilot conductor and the ground conductor. A thyristor and a second resistor connect the high voltage conductor to the ground conductor. The gate of the thyristor is configured to receive a signal from the thermistor, causing the thyristor to divert current from the high voltage conductor, in response to the thermistor sensing an increase in temperature. The ground fault detector in the EVSE is thereby tripped when the thermistor senses an increased temperature.

In still another example embodiment, the temperature sensor includes a pair of series connected thermistor, diode, and resistor circuits. A first series connected thermistor, diode, and resistor circuit connects the high voltage conductor to the ground conductor. A second series connected thermistor, diode, and resistor circuit connects the return conductor to the ground conductor. The ground fault detector in the EVSE is tripped if either thermistor senses an increased temperature and diverts current to the ground conductor. The diodes prevent currents in the two circuits from cancelling each other in the event that the thermistor resistances would be equal.

The EVSE utilizes existing components, with little or no modification required to automatically shut down charging operations in response to a temperature increase in a charging handle. Temperature sensing within the charging handle is achieved without significant added cost or complexity and minimal modification of the handle. The chances of overheating and possibly melting the charging handle while the handle is fastened to the EV during charging operations are thus reduced.

DETAILED DESCRIPTION OF EMBODIMENTS OF THE INVENTION

Figure 1A:
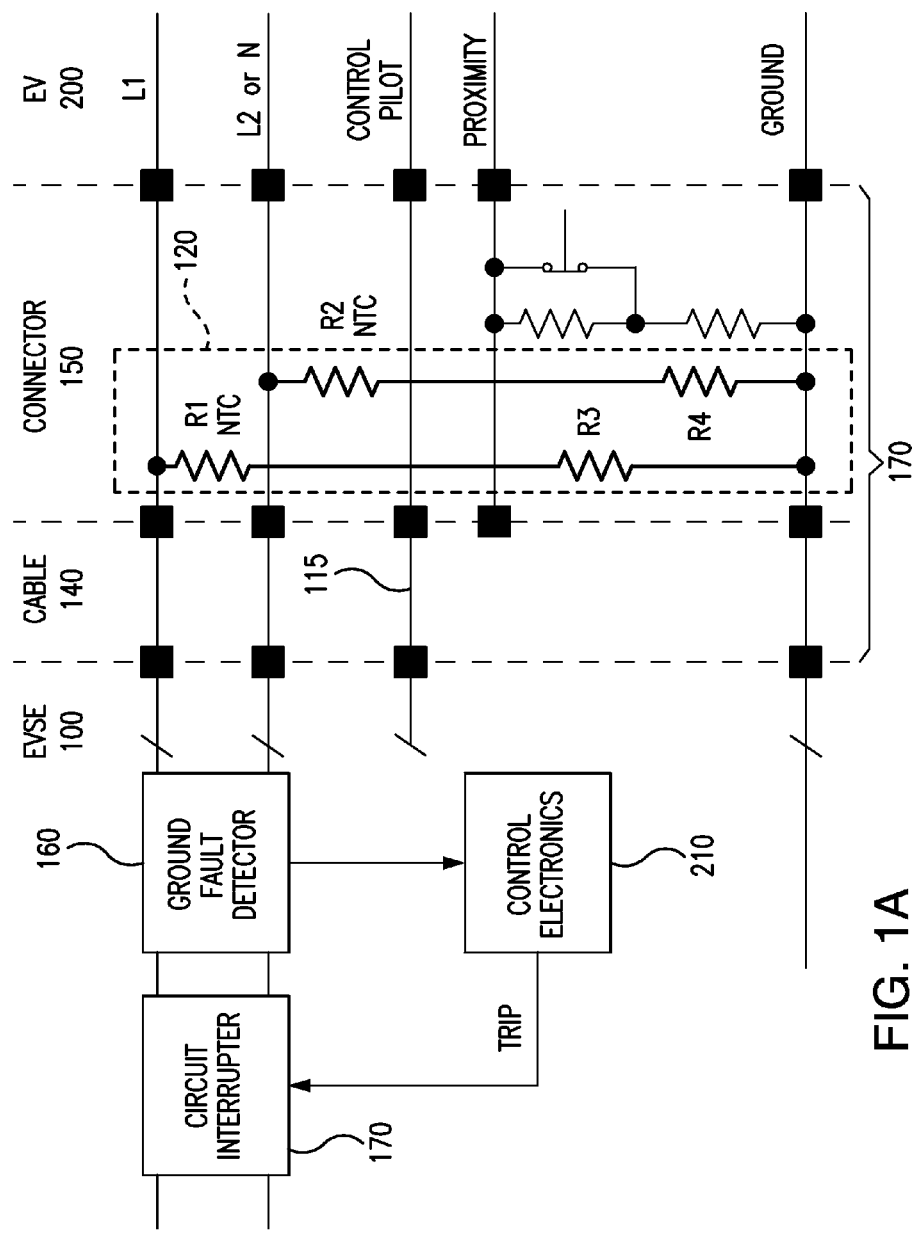
FIG. 1A shows a temperature sensor with a pair of series connected thermistor and resistor circuits. A first series connected thermistor and resistor circuit connects the high voltage conductor to the ground conductor. A second series connected thermistor and resistor circuit connects the return conductor to the ground conductor. The ground fault detector in the EVSE is tripped if either thermistor senses an increased temperature and diverts current to the ground conductor.

FIG. 1A shows an example charging system in either a private or a public location, comprising an EVSE 100 connected by a cordset 170 comprising a charging cable 140 and charging handle 150, to a power inlet of an EV 200, for charging the EV's rechargeable batteries. The EVSE's charging cable and charging handle provide AC charging current to the EV on high voltage conductor L1 and return conductor L2, which is converted to regulated direct current by a charger onboard the EV, for replenishing the charge of the rechargeable batteries. An equipment ground conductor G connects the non-current carrying metal parts of the EVSE to the chassis ground of the EV and provides a return path for current carried in the control pilot circuit. The EVSE generates a control pilot signal CP on control pilot line 115 of the charging cable and charging handle. The control pilot signal CP functions to verify that an EV is present and connected, permits energization/de-energization of the charging current, and provides a maximum available current rating to the EV. The rechargeable batteries power at least one electric motor to propel the EV, based on driver input to the EV's accelerator pedal.

The invention provides temperature based protection in the cordset handle or charging handle 150 of the EVSE 100, with little or no modification required to EVSE control electronics 210 and minimal modification of the charging handle 150.

The functional block diagram of FIG. 1A illustrates an example EVSE 100 with an example embodiment of the charging handle temperature sensor 120 inside the charging handle or connector 150. The temperature sensor 120 includes a pair of series connected thermistor and resistor circuits. A first series connected circuit including thermistor R1-NTC and resistor R3 connects the high voltage conductor L1 to the ground conductor G. A second series connected circuit including thermistor R2-NTC and resistor R4 connects the return conductor L2 or N to the ground conductor G. A ground fault detector 160 in the EVSE 100 is tripped if either thermistor R1-NTC or R2-NTC senses an increased temperature and diverts current to the ground conductor G.

If thermistor R1-NTC in the first series connected circuit, senses an increased temperature, it diverts a portion of the current in the high voltage conductor L1 to the ground conductor G, which causes the current in the return conductor L2 or N to be less than the current in the high voltage conductor L. This difference in the currents is detected by the ground fault detector 160. The ground fault detector 160 may be a conventional ground fault interrupter circuit designed to protect users from an electrical shock by interrupting the source of power on high voltage conductor L1 and return conductor L2, when there is a difference in the currents in these conductors. In an example embodiment, when the ground fault detector 160 detects a difference in the currents in conductor L1 and conductor L2 or N, ground fault detector 160 outputs a detection signal to the control electronics 210, which then sends a tripping signal to the circuit interrupter 170, to thereby interrupt the source of power on conductor L1 and conductor L2. The ground fault detector 160 outputs a detection signal to the control electronics 210, which then sends a tripping signal to the circuit interrupter 170, to thereby interrupt the source of power on conductor L1 and conductor L2.

If thermistor R2-NTC in the second series connected circuit, senses an increased temperature, it diverts a portion of the current in the return conductor L2 to the ground conductor G, which causes the current in the return conductor L2 or N to be less than the current in the high voltage conductor L. This difference in the currents is detected by the ground fault detector 160.

The ground fault detector 160, control electronics 210, and circuit interrupter 170 components in the EVSE are existing components. Little or no modification is required to the EVSE to automatically shut down charging operations in response to a temperature increase in the charging handle. Temperature based protection within the charging handle is achieved without significant added cost or complexity and minimal modification of the handle.

The EVSE 100 may operate based on the SAE J1772 standard, to provide 208 to 240 volt AC, single phase power for a maximum continuous current of 30 Amperes, on the high voltage conductor L1 and return conductor L2 of the EVSE cordset 170. The SAE J1772 standard specifies the control pilot signal CP functions on the control pilot line 115 of the EVSE cordset 170.

The thermistors respond to temperature rise with lower resistance, resulting in some current from L1/L2 to ground. Regional standards require that the EVSE provide ground current detection and protection according to a trip curve with current response time characteristics. In the United States, for example, UL2231 requires, as one option, the EVSE disconnect the L1 and L2/N conductors if leakage to ground above a nominal threshold of 18-20 mA is measured. By choosing the appropriate NTC thermistor and series current limiting resistor values, the ground current through the thermistors and current limiting resistors will cross above this threshold at a specific temperature. In this way, the invention reuses the function of ground current protection function provided by the EVSE to interrupt charging based on a chosen temperature.

Figure 1B:
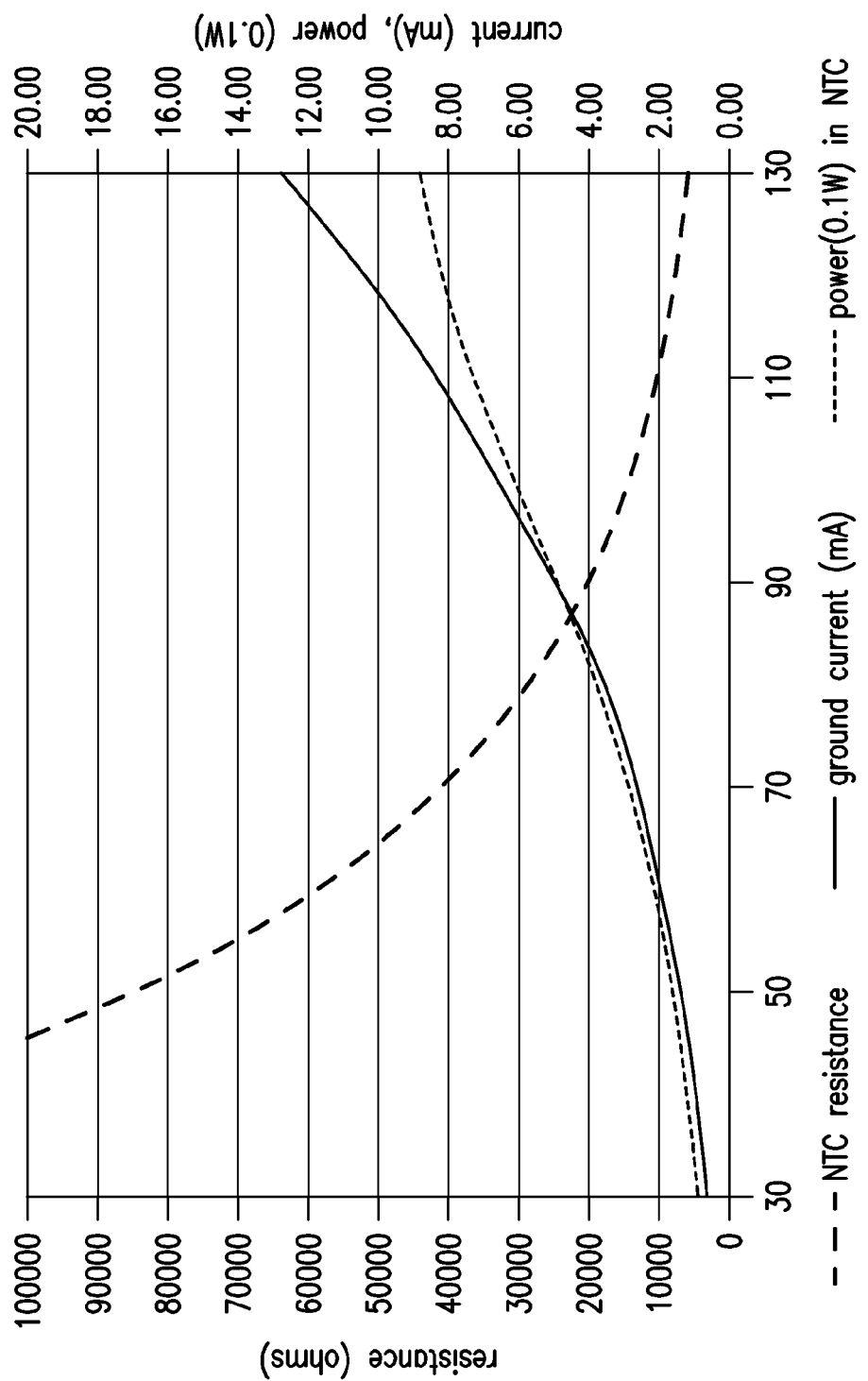
FIG. 1B is an example graph of measured ground current (mA), power dissipation in the thermistor (W), and negative temperature coefficient (NTC) thermistor resistance (Ohms) vs temperature, for the temperature sensor of FIG. 1A.

The following table and the chart of FIG. 1B show an example implementation of the invention in FIG. 1A, and the ground current through the thermistors is determined by the temperature.

| temp. (C.) | NTC resistance | ground current (mA) | power (0.1 W) in NTC |
|---|---|---|---|
| 25 | 200000 | 0.59 | 0.69 |
| 30 | 170000 | 0.69 | 0.81 |
| 40 | 119000 | 0.98 | 1.13 |
| 50 | 83300 | 1.37 | 1.57 |
| 60 | 58310 | 1.93 | 2.16 |
| 70 | 40817 | 2.68 | 2.93 |
| 80 | 28572 | 3.68 | 3.88 |
| 90 | 20000 | 5.00 | 5.00 |
| 95 | 17000 | 5.71 | 5.55 |
| 100 | 14450 | 6.50 | 6.11 |
| 105 | 12283 | 7.37 | 6.67 |
| 110 | 10440 | 8.31 | 7.21 |
| 115 | 8874 | 9.32 | 7.71 |
| 120 | 7543 | 10.40 | 8.15 |
| 125 | 6412 | 11.53 | 8.52 |
| 130 | 5450 | 12.70 | 8.79 |
| 135 | 4632 | 13.90 | 8.95 |
| 140 | 3938 | 15.12 | 9.00 |
| 145 | 3347 | 16.33 | 8.93 |
| 150 | 2845 | 17.53 | 8.74 |

FIG. 1B is an example graph of measured ground current (mA), power dissipation in the thermistor (W), and negative temperature coefficient (NTC) thermistor resistance (Ohms) vs temperature, for the temperature sensor of FIG. 1A. As the example in FIG. 1B shows, the NTC thermistor adds some power dissipation to the system, even during normal operation. It may be desirable to reduce the heating added by the thermistor. An alternative embodiment shown in FIG. 2A adds an active component controlled by the thermistor resistance, to minimize power dissipation during normal operation.

Figure 2A:
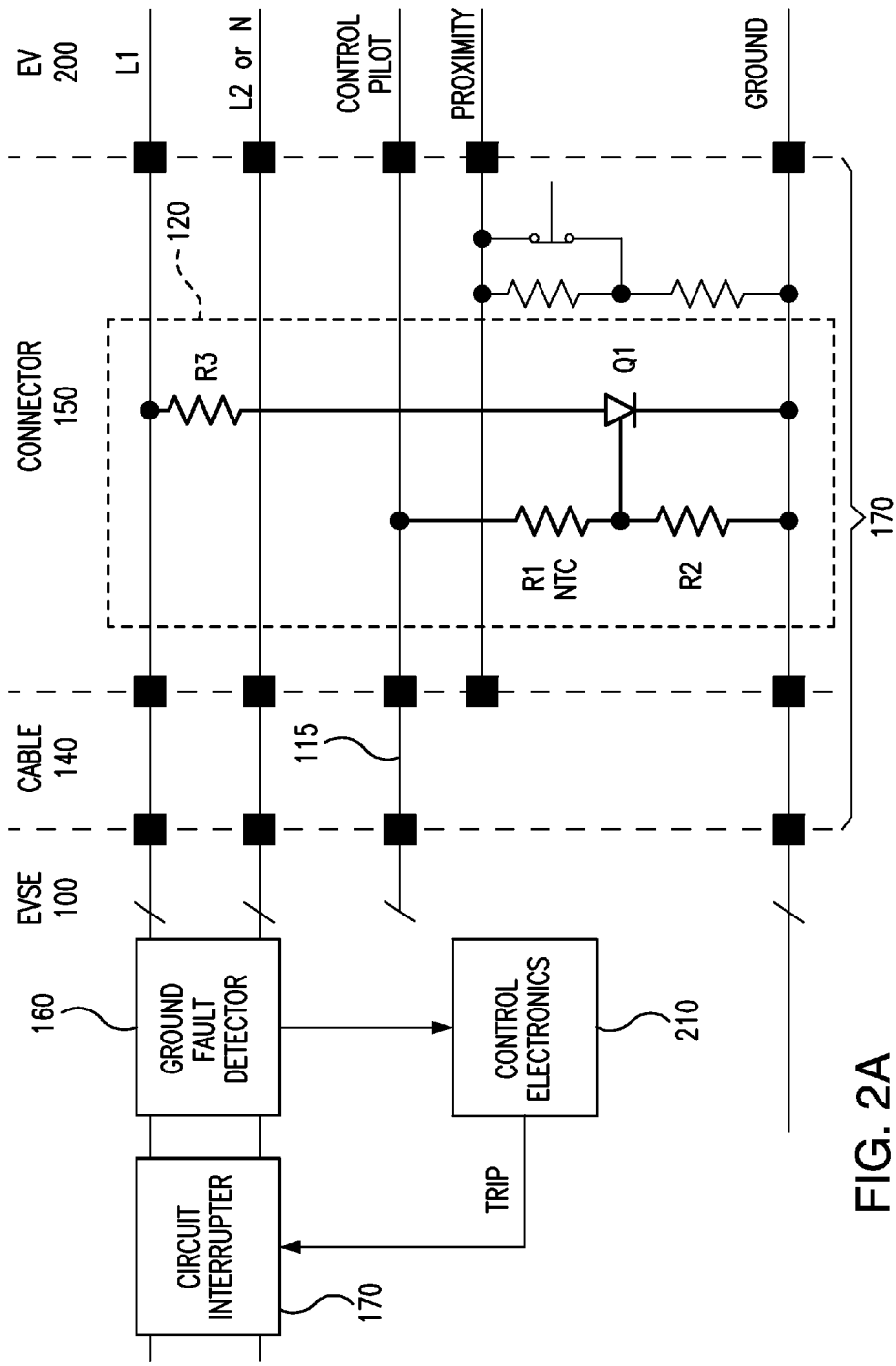
FIG. 2A shows a temperature sensor with a thermistor and a first resistor connected in series between a control pilot conductor and the ground conductor. A thyristor and a second resistor connect the high voltage conductor to the ground conductor. The gate of the thyristor is configured to receive a signal from the thermistor, causing the thyristor to divert current from the high voltage conductor, in response to the thermistor sensing an increase in temperature. The ground fault detector in the EVSE is thereby tripped when the thermistor senses an increased temperature.

The functional block diagram of FIG. 2A illustrates an example EVSE 100 with an example alternate embodiment of the charging handle temperature sensor 120 inside the charging handle or connector 150. The temperature sensor 120 includes a thermistor R1-NTC and a first resistor R2 connected in series between a control pilot conductor 115 and the ground conductor G. A thyristor Q1 and a second resistor R3 connect the high voltage conductor L1 to the ground conductor G. The gate of the thyristor Q1 is configured to receive a signal from the node between the thermistor R1-NTC and the resistor R2, causing the thyristor Q1 to divert current from the high voltage conductor L1, in response to the thermistor R1-NTC sensing an increase in temperature. The ground fault detector 160 in the EVSE 100 is thereby tripped when the thermistor R1-NTC senses an increased temperature. If thermistor R1-NTC senses an increased temperature, it diverts a portion of the current in the high voltage conductor L1 to the ground conductor G, which causes the current in the return conductor L2 or N to be less than the current in the high voltage conductor L. This difference in the currents is detected by the ground fault detector 160.

Figure 2B:
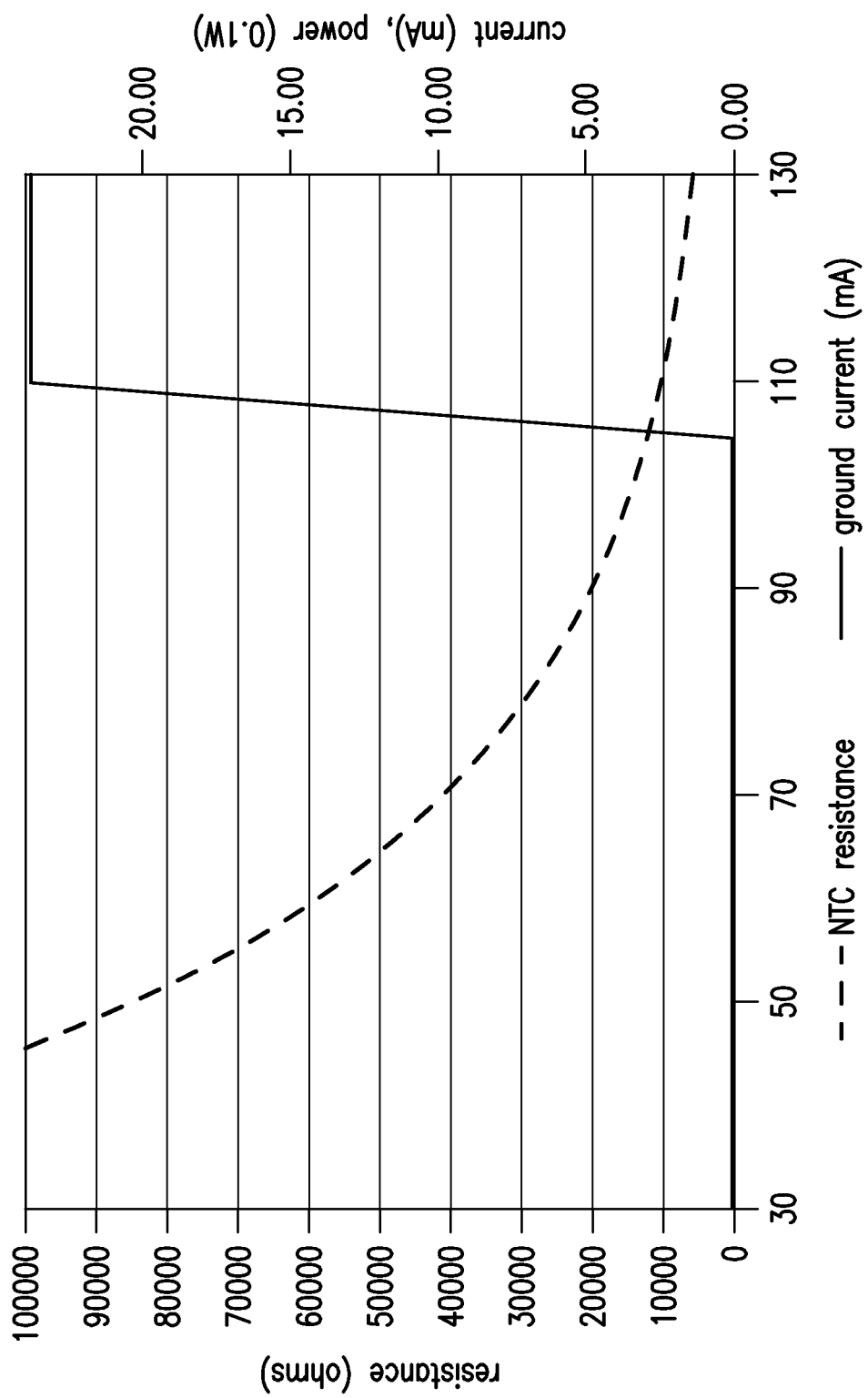
FIG. 2B is an example graph of measured ground current (mA) and negative temperature coefficient (NTC) thermistor resistance (Ohms) vs temperature, for the temperature sensor of FIG. 2A.

The following table and chart in FIG. 2B show the thermistor resistance, ground current and added power dissipation with the example embodiment.

| temp. (C.) | NTC resistance | V thyristor gate | ground current (mA) | power dissipation (W) |
|---|---|---|---|---|
| 25 | 200000 | 0.04 | 0.00 | 0 |
| 30 | 170000 | 0.05 | 0.00 | 0 |
| 40 | 119000 | 0.08 | 0.00 | 0 |
| 50 | 83300 | 0.11 | 0.00 | 0 |
| 60 | 58310 | 0.15 | 0.00 | 0 |
| 70 | 40817 | 0.22 | 0.00 | 0 |
| 80 | 28572 | 0.31 | 0.00 | 0 |
| 90 | 20000 | 0.43 | 0.00 | 0 |
| 95 | 17000 | 0.51 | 0.00 | 0 |
| 100 | 14450 | 0.59 | 0.00 | 0 |
| 105 | 12283 | 0.69 | 0.00 | 0 |
| 110 | 10440 | 0.80 | 23.80 | 2.856 |
| 115 | 8874 | 0.94 | 23.80 | 2.856 |
| 120 | 7543 | 1.09 | 23.80 | 2.856 |
| 125 | 6412 | 1.26 | 23.80 | 2.856 |
| 130 | 5450 | 1.45 | 23.80 | 2.856 |

FIG. 2B is an example graph of measured ground current (mA) and negative temperature coefficient (NTC) thermistor resistance (Ohms) vs temperature, for the temperature sensor of FIG. 2A.

The control pilot signal specified in the SAE J1772 standard is a 1 kHz square wave signal in the range of +12 and −12 volts. Prior to the commencement of charging the EV, the control pilot signal uses its voltage to define the state of the charging transaction. If the control pilot signal is a steady voltage of +12 volts DC, this indicates State A, that an EV is not connected. If the control pilot is a 1 kHz square wave signal with positive voltage of +9 volts and negative voltage of −12 volts, this indicates State B, that an EV is connected, but is not ready to receive a charge. The SAE J1772 standard specifies that a control pilot 1 kHz square wave signal positive voltage of +6 volts and negative voltage of −12 volts indicates State C, that the EV is ready to accept charge. The signal is generated in the EVSE and the EV puts an impedance on the line and the voltage on control pilot drops. After detecting the control pilot signal in State C, the EVSE proceeds to deliver the charging current to the EV over its power lines L1 and L2.

During the charging of the EV, if the temperature in the charging handle 150 increases, the thermistor R1-NTC in FIG. 2A reduces its resistance, allowing a small current to flow through the series connected thermistor and resistor R2, thereby raising the voltage of the node between the thermistor and the resistor R2. The node is connected to the gate of the thyristor Q1. When the voltage on the gate rises above a threshold voltage, the thyristor Q1 becomes conductive. The gate of the thyristor Q1 is configured to receive the increased voltage as a signal from the node between the thermistor R1-NTC and the resistor R2, causing the thyristor Q1 to divert current from the high voltage conductor L1, in response to the thermistor R1-NTC sensing an increase in temperature. The ground fault detector 160 in the EVSE 100 is thereby tripped when the thermistor R1-NTC senses an increased temperature.

The placement of the temperature sensor 120 determines the components in the handle which will be monitored for temperature based protection. Depending on the design of the EVSE cordset and charging handle, it may be desirable to detect temperature increases of a specific conductor or nonconducting part of the handle. Connecting the temperature sensor 120 thermally, but not electrically, to a specific part of interest, allows detection at the desired element in the handle.

Figure 3:
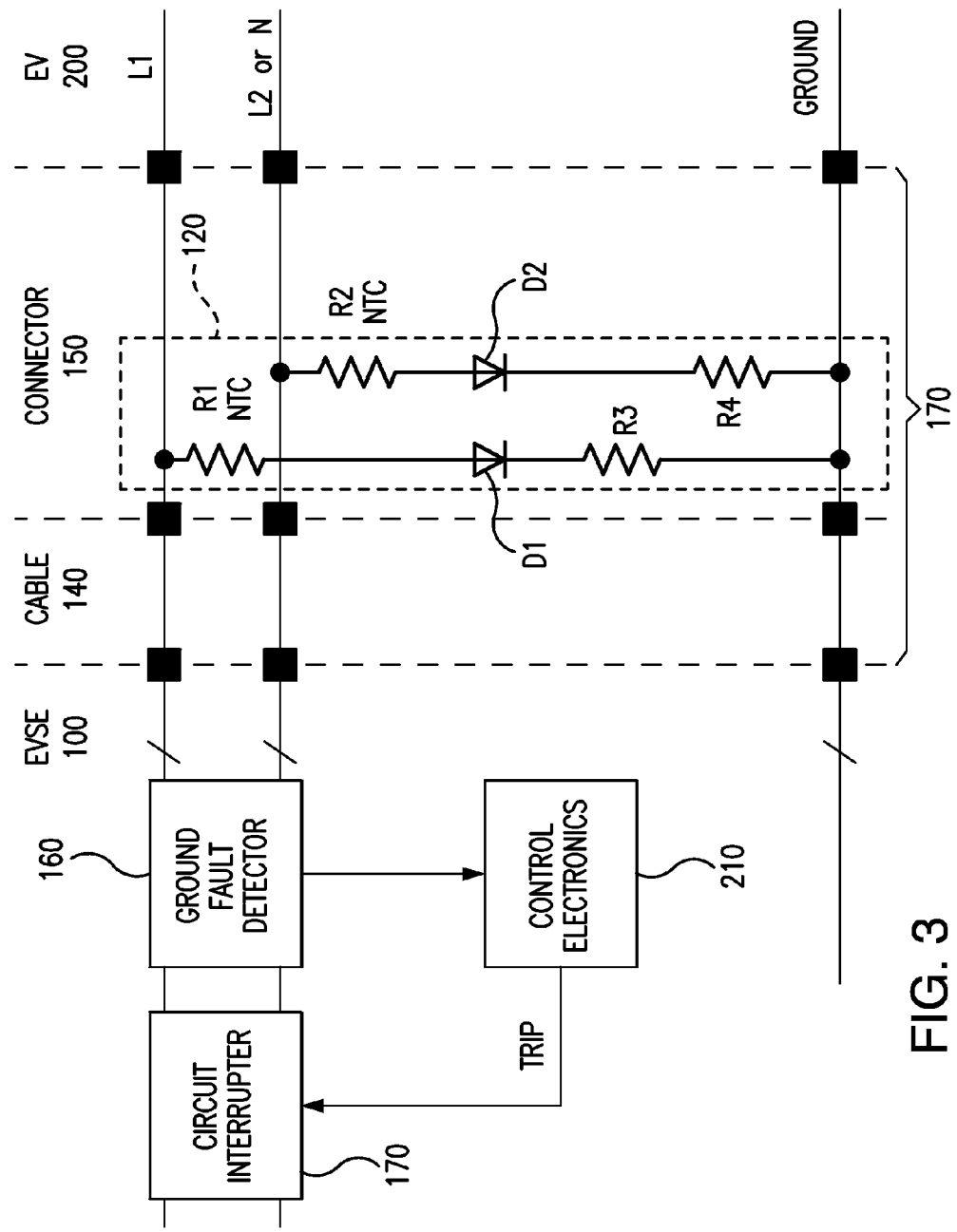
FIG. 3 shows a temperature sensor with a pair of series connected thermistor, diode, and resistor circuits. A first series connected thermistor, diode, and resistor circuit connects the high voltage conductor to the ground conductor. A second series connected thermistor, diode, and resistor circuit connects the return conductor to the ground conductor. The ground fault detector in the EVSE is tripped if either thermistor senses an increased temperature and diverts current to the ground conductor. The diodes prevent currents in the two circuits from cancelling each other in the event that the thermistor resistances would be equal.

FIG. 3 shows a temperature sensor with a pair of series connected thermistor, diode, and resistor circuits. A first series connected thermistor, diode, and resistor circuit connects the high voltage conductor to the ground conductor. A second series connected thermistor, diode, and resistor circuit connects the return conductor to the ground conductor. The ground fault detector in the EVSE is tripped if either thermistor senses an increased temperature and diverts current to the ground conductor. The diodes prevent currents in the two circuits from cancelling each other in the event that the thermistor resistances would be equal.

The temperature sensor 120 includes a pair of series connected thermistor, diode, and resistor circuits. A first series connected thermistor R1-NTC, diode D1, and resistor R3 circuit connects the high voltage conductor L1 to the ground conductor. A second series connected thermistor R2-NTC, diode D2, and resistor R4 circuit connects the return conductor L2 to the ground conductor. The ground fault detector 160 in the EVSE 100 is tripped if either thermistor R1-NTC or R2-NTC senses an increased temperature and diverts current to the ground conductor. The diodes D1 and D2 prevent currents in the two circuits from cancelling each other in the event that the thermistor R1-NTC or R2-NTC resistances would be equal.

In an example embodiment, the temperature based protection is provided without modification of the EVSE control electronics or firmware, by reusing the ground fault protection function already implemented in the EVSE. In an alternate example embodiment, the invention may be implemented with the EVSE further modified to provide differentiation between the ground fault current signature of current leakage through personnel and through the temperature sensor circuit. Detecting the ground fault characteristics of the temperature sensor circuit allows the EVSE to take specific action in response to the temperature based protection function. The EVSE may reduce the charging rate offered to the EV to decrease resistive heating of conductors and contact points within the charging handle. This may allow the EV to continue charging, at a reduced rate, while reducing the temperature to within nominal limits. The EVSE may also completely discontinue charging the EV, and inhibit automatic reset of the ground fault interrupter. The EVSE may indicate the temperature rise problem to the user, or signal an undesired operating condition to the owner or operator of the EVSE to initiate maintenance of the cordset.

The invention provides temperature based protection of hot spots within the EVSE handle without significant added cost or complexity. The invention makes novel reuse of existing infrastructure in the EVSE to achieve temperature based protection, with little or no modification required at the EVSE control electronics, and minimal modification required at the handle. The invention does not require significant additional infrastructure in the EVSE. Reusing the existing ground fault protection function of the EVSE minimizes the required modification of the EVSE to implement the invention and provide a temperature based protection. The invention may be implemented using the existing charging handle with a small hardware modification, using the existing cord without any modification, and using the existing EVSE without any hardware or firmware modification. The resulting invention reduces the chances of overheating and possibly melting the charging handle while the handle is fastened to the EV during charging operations.

Although specific example embodiments of the invention have been disclosed, persons of skill in the art will appreciate that changes may be made to the details described for the specific example embodiments, without departing from the spirit and the scope of the invention.

The invention claimed is:

1. A circuit for automatic shutdown of charging operations in response to a temperature increase in a charging handle of an electric vehicle charging station, comprising:
    a temperature sensor connected between a ground conductor and a high voltage conductor in a charging handle that is connected by a charging cable to an electric vehicle charging station, the charging cable including the high voltage conductor and a return conductor, the charging handle including the return conductor, wherein when the temperature sensor is exposed to an increase in temperature in the charging handle, a portion of current in the high voltage conductor flows through the temperature sensor to the ground conductor, instead of the return conductor, thereby causing the ground fault detector to trip in the charging station.

2. The circuit for automatic shutdown of charging operations in response to a temperature increase in a charging handle of an electric vehicle charging station of claim 1, further comprising:
    a thermistor in the temperature sensor, the thermistor being configured to change its resistance in response to an increase in temperature in the charging handle, thereby causing the portion of current in the high voltage conductor to flow to the ground conductor, instead of the return conductor.

3. The circuit for automatic shutdown of charging operations in response to a temperature increase in a charging handle of an electric vehicle charging station of claim 1, further comprising:
    a thermistor and a resistor in the temperature sensor, the thermistor and resistor connected in series between the high voltage conductor and the ground conductor in the charging handle of the electric vehicle charging station, the thermistor being configured to reduce its resistance in response to an increase in temperature in the charging handle, thereby causing the portion of current in the high voltage conductor to flow through the thermistor and the resistor to the ground conductor, instead of the return conductor.

4. A circuit for automatic shutdown of charging operations in response to a temperature increase in a charging handle of an electric vehicle charging station, comprising:
    a temperature sensor connected between a ground conductor and a high voltage conductor in a charging handle of an electric vehicle charging station, the charging handle including a return conductor, wherein when the temperature sensor is exposed to an increase in temperature in the charging handle, a portion of current in the high voltage conductor flows through the temperature sensor to the ground conductor, instead of the return conductor, thereby causing a ground fault detector to trip in the charging station;
    a thermistor and a first resistor in the temperature sensor, the thermistor and first resistor connected in series between a control pilot conductor and the ground conductor in the charging handle of the electric vehicle charging station, the thermistor being configured to change its resistance in response to an increase in temperature in the charging handle, thereby causing a voltage to change at a node between the thermistor and the first resistor; and
    a thyristor and a second resistor in the temperature sensor, the thyristor and second resistor connected in series between the high voltage conductor and the ground conductor in the charging handle of the electric vehicle charging station, the thyristor having a gate electrode connected to the node between the thermistor and the first resistor so that a voltage at the node between the thermistor and the first resistor is applied to the gate, the thyristor being configured to become conductive in response to a voltage on its gate reaching a threshold voltage, the thyristor thereby conducting the portion of current in the high voltage conductor to flow through the thyristor and second resistor to the ground conductor, instead of the return conductor, in response to the increase in temperature in the charging handle.

5. A circuit for automatic shutdown of charging operations in response to a temperature increase in a charging handle of an electric vehicle charging station, comprising:

a temperature sensor connected between a ground conductor and a high voltage conductor in a charging handle of an electric vehicle charging station, the charging handle including a return conductor, wherein when the temperature sensor is exposed to an increase in temperature in the charging handle, a portion of current in the high voltage conductor flows through the temperature sensor to the ground conductor, instead of the return conductor, thereby causing a ground fault detector to trip in the charging station;

a first thermistor, a first diode, and a first resistor in the temperature sensor, the first thermistor, first diode, and first resistor connected in series between the high voltage conductor and the ground conductor in the charging handle of the electric vehicle charging station, the first thermistor being configured to reduce its resistance in response to an increase in temperature in the charging handle, thereby causing the portion of current in the high voltage conductor to flow through the first thermistor, the first diode, and the first resistor to the ground conductor, instead of the return conductor, thereby causing a ground fault detector to trip in the charging station; and a second thermistor, a second diode, and a second resistor in the temperature sensor, the second thermistor, second diode, and second resistor connected in series between the return conductor and the ground conductor in the charging handle of the electric vehicle charging station, the second thermistor being configured to reduce its resistance in response to an increase in temperature in the charging handle, thereby causing a portion of current in the return conductor to flow through the second thermistor, the second diode, and the second resistor to the ground conductor, instead of the high voltage conductor, thereby causing the ground fault detector to trip in the charging station.

* * * * *